United States Patent
Abatzoglou et al.

(10) Patent No.: US 7,532,150 B1
(45) Date of Patent: May 12, 2009

(54) RESTORATION OF SIGNAL TO NOISE AND SPATIAL APERTURE IN SQUINT ANGLES RANGE MIGRATION ALGORITHM FOR SAR

(75) Inventors: Theagenis J. Abatzoglou, Huntington Beach, CA (US); Leo H. Hui, Alhambra, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/077,669

(22) Filed: Mar. 20, 2008

(51) Int. Cl.
*G01S 13/90* (2006.01)
(52) U.S. Cl. .................. 342/25 F; 342/25 A; 342/25 R
(58) Field of Classification Search ....... 342/25 A–25 R
See application file for complete search history.

(56) References Cited

U.S. PATENT DOCUMENTS

| 6,873,285 | B2 * | 3/2005 | Carrara et al. ............ 342/25 R |
| 6,987,479 | B1 * | 1/2006 | Hansen et al. ............. 342/25 F |
| 2006/0109164 | A1 * | 5/2006 | Cho et al. ................. 342/25 R |

* cited by examiner

*Primary Examiner*—Ian J Lobo
(74) *Attorney, Agent, or Firm*—Leonard A. Alkov (57) ABSTRACT

A moving radar generates a search mode synthetic aperture image of a patch having a principal scatterer. The boundaries of the patch are from $R_0$ to $R_1$ slant range and $\theta_0$ to $\theta_1$ azimuth angle. A computer motion compensates digital samples to obtain a motion compensated digital array. The motion compensated digital array is converted to a frequency array in the frequency domain $K_x$, $K_y$. The frequency array has a rectangular aperture extending $\Delta K_x$ and $\Delta K_y$. Available samples from the frequency array are computed using a Range Migration Algorithm including a Stolt interpolation. Usable samples are identified from the available samples using one or more criteria. Usable samples are removed from available samples to obtain incomplete samples. Features related to the patch having a principal scatterer are extracted from the usable samples. The features are used to extrapolate extrapolated samples from the usable samples. The extrapolated samples, the usable samples and the incomplete samples are combined to compute the image of the patch and principal scatterer. Incomplete samples are substituted where they overlap interpolated samples.

16 Claims, 7 Drawing Sheets

RESTORATION OF SIGNAL TO NOISE AND SPATIAL APERTURE IN SQUINT ANGLES RANGE MIGRATION ALGORITHM FOR SAR

This invention was made with Government support under contract No. F19628-00-C-0100 awarded by the Department of the Air Force. The Government has certain rights in this invention.

BACKGROUND OF THE INVENTION

1. Field of Invention

This invention is in the field of enhancing Synthetic Aperture Radar (SAR) images at squint angles approaching the direction of travel of the SAR platform using search (swath) mode.

2. Description of the Related Art

Synthetic Aperture Radar (SAR) is used for ground mapping as well as target identification. The general principle behind SAR is to coherently combine the amplitude and phase information of radar returns from a plurality of sequentially transmitted pulses. These pulses are from a relatively small antenna on a moving platform. As the platform moves, the information contained in the pulses is coherently combined to arrive at a high resolution SAR image.

The plurality of returns creating a SAR image generated by the transmitted pulses along a presumed known path of the platform makes up an array. Theoretically, during the array, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the array.

SAR imaging can be divided into two general types, spot SAR and search (swath) SAR. In spot SAR, the antenna is pointed towards a point, or spot, around which the image is rendered. In contrast, for swath SAR, the antenna is held at a constant angle, the squint angle, with respect to the travel direction of the platform, thus yielding a strip image as the platform moves forward. Spotlight mode produces two dimensional images of limited size of a limited area by steering the antenna beam to the center of the map (image) center for the duration of an array. Conversely, search mode produces image strips of theoretically unlimited length by maintaining a fixed azimuth antenna orientation during a SAR data collection period, or array. Unlike spotlight mode that typically produces images oriented in the range-azimuth direction, swath SAR produces images oriented in the along track and cross track direction.

The are substantial SAR search (swath) mode limitations. For example, uncompensated platform motion during search mode results in image smearing in the azimuth direction caused by pulse data that affects azimuth response. Because target image in search SAR smears in the direction of both image axes, it is difficult to estimate and correct residual phase error for autofocus using one dimensional batch processing.

Another difficulty presented during search mode is in merging the phase error for multiple parts forming the SAR image of a patch. The boundaries where parts of the patch meet are blurred, not well defined as the phase definitions in that area are not clearly defined, unlikely to be continuous. Hence, phase errors need to be compensated for and cannot be estimated for all ground targets in a continuous manner. These individual parts of a patch need to be corrected for a continuous image. Lack of such corrections will introduce unwanted, spurious high frequency components in the resulting image thereby degrading its quality and utility.

To add to above limitations of search mode SAR, as the swath being imaged becomes wider and ahead of the moving platform, forcing a high squint angle departing substantially from the broadside direction, a number of radar returns in the area of the high squint angle are no longer usable. Thus, at high squint angles image quality, resolution, signal to noise ratio, and false alarm rates are negatively impacted.

SUMMARY OF THE INVENTION

Above limitations are reduced and SAR search images improved by a radar for generating a search mode synthetic aperture image of a patch having a principal scatterer from periodic pulse returns reflected from the patch. The radar is mounted on a platform having a motion. The radar comprises an analog to digital converter for converting the pulse returns into a plurality of digital samples. The digital samples are converted at range bin intervals defining the size of range bins in the slant range direction.

Within the radar, a computer is used for motion compensating the digital samples with respect to platform motion to obtain a motion compensated digital array. The computer converts the motion compensated digital array to a frequency array in a frequency domain ($K_x$, $K_y$) using a transform, typically the Fourier Transform, using a Fast Fourier Transform (FFT) method. Available samples are computed from the frequency array using a Range Migration Algorithm including a Stolt interpolation. Usable samples from said available samples are identified using one or more criteria. After removing said usable samples from said available samples leaves incomplete samples. Features related to the principal scatterer are extracted from the usable samples. The features are used to extrapolate extrapolated samples from usable samples.

The extrapolated samples, the usable samples and the incomplete samples are combined for computing the search mode synthetic aperture image of said patch and said principal scatterer. Where $K_x$, $K_y$ coordinates match, incomplete samples are substituted for extrapolated samples.

One criterion for identifying usable samples from available samples is a maximum area rectangle of fixed proportions, circumscribed in a boundary defined by the edges of the ground footprint of the SAR illumination in $K_x$, $K_y$ space.

Another criterion for identifying usable samples from available samples is a maximum area rectangle, circumscribed in a boundary defined by the edges of the ground footprint of the SAR illumination in $K_x$, $K_y$ space.

Another criterion is an ellipse corresponding to SAR transmit/receive antenna pattern projected on the ground along the slant range, in $K_x$, $K_y$ space.

DETAILED DESCRIPTION OF THE INVENTION

The present invention describes a method for improving search (swath) type SAR images of a patch where the SAR data includes returns from high squint angles, approaching the direction of travel of the SAR moving platform.

SAR images require accurate phase alignment of the reflected pulses to achieve the in-phase combination of the information contained therein. Images generated in search mode are oriented in the along-track, cross track direction, unlike the range/azimuth approach of spot mode.

SAR images require a complete (full) array of reflected pulse returns of usable quality to generate the SAR image. Each of the returns from the reflected pulses are accurately phase aligned, to achieve the in-phase combination of the information contained therein. SAR image degradation, typically due to phase errors arise from many sources. One source of such errors is navigation data inaccuracies from motion compensation, or from atmospheric effects on radar returns. Another is pulse interrupts (missing pulses) within an incomplete array. Yet another source, discussed herein, is position of the radar returns with respect to the direction of travel of the platform carrying the SAR radar.

As described below, a signal processing approach for correcting the effects of distorted, missing samples in the phase history of an incomplete SAR array is described. The Range Migration Algorithm (RMA) is used herein, as described by W. G. Carrara, R. S. Goldman and R. M. Majewski in *Spotlight Synthetic Aperture Radar*, Artech House, Boston, 1995, pp 401 to 439, incorporated herein in its entirety by reference. RMA handles both the spot and search case in a similar fashion. For RMA, an application of the Azimuth deskew algorithm insures the range compressed samples are aligned in $K_x$ before the interpolation process takes place.

Figure 1:
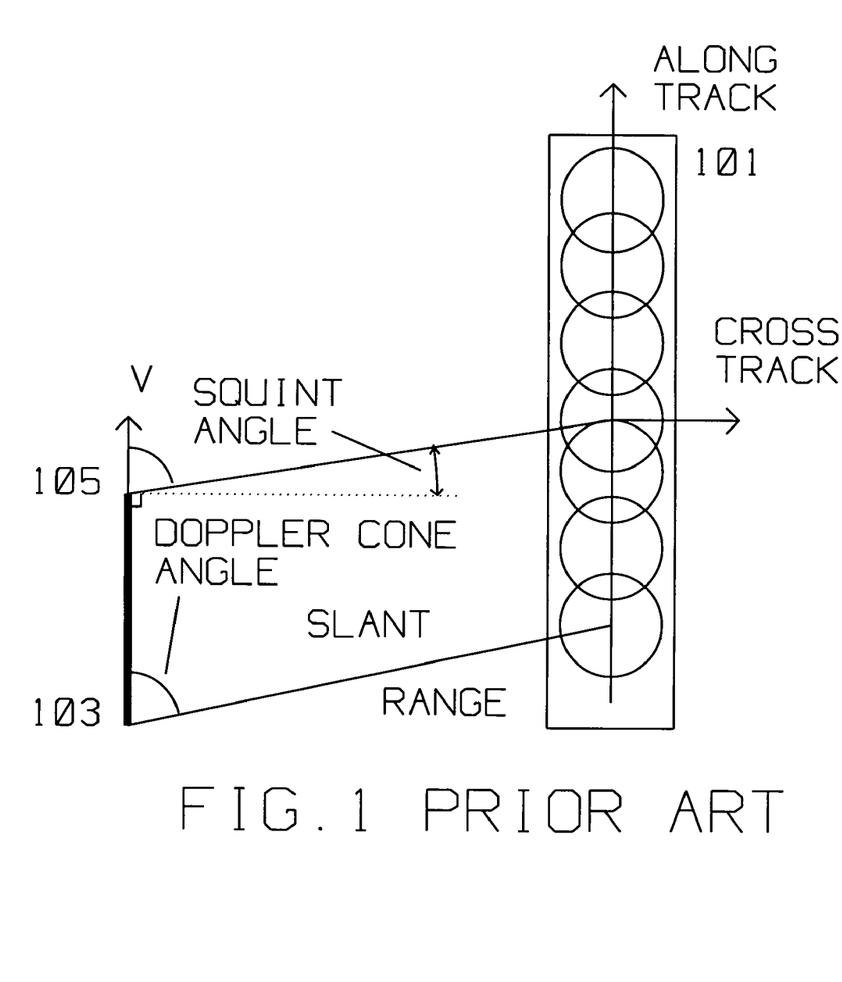
FIG. 1 is a SAR search configuration of the prior art where the squint angle is near broadside.

FIG. 1 shows the typical prior art geometric relationship between a moving platform carrying a radar transmitter/receiver using Synthetic Aperture (SAR) search (swath) methods imaging patch 101 by said radar transmitter/receiver. The moving platform is initially at position 103, travels with velocity V in the direction shown to position 105. In SAR search mode, the SAR antenna azimuth is fixed at the squint angle shown, oriented towards patch 101 as the platform moves with velocity V. The moving platform moves from position 103 to position 105 with velocity V, while maintaining a fixed squint angle. From a mathematical point of view, Doppler cone angle=90 degrees−Squint Angle The radar illuminates portions of patch 101 as the moving platform progresses. Radar pulses are transmitted and corresponding returns received at many points during the arrays collected between position 103 and position 105. SAR search mode is different from spotlight mode. Spotlight mode generally produces images oriented in the range and azimuth direction. In search mode, the image is in the along track and cross track direction. Imperfections in motion compensation for search mode will smear the resulting image in both along track and cross track axes. Thus, smearing is the result of two sources of errors, one corresponding to each axis. Because of error contribution from both axes, it is difficult to estimate and correct the residual, post motion compensation errors using one dimensional processing.

The search (swath) types of SAR radar are well known in the art and are described, for example, by J. C. Curlander, et al, in *Synthetic Aperture Radar: Systems and Processing*, Wiley, 1991, incorporated herein by reference in its entirety.

Figure 2:
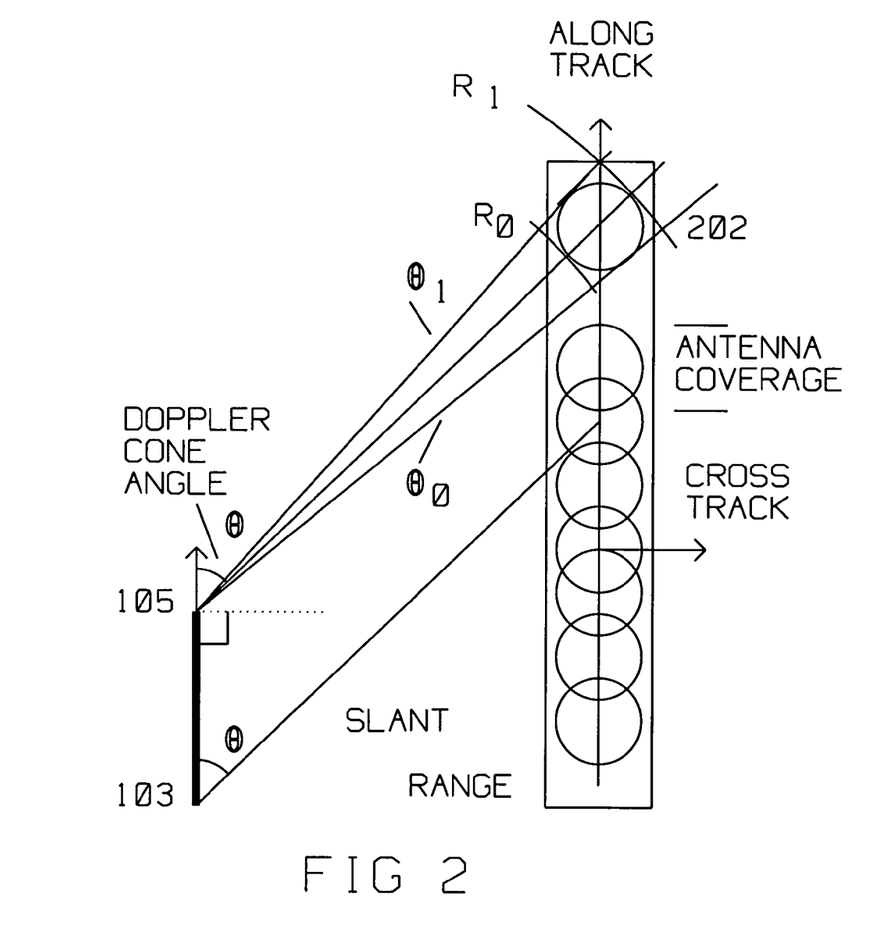
FIG. 2 is a SAR search configuration of the present disclosure having a wide squint angle.

FIG. 2 is a SAR radar of the present disclosure covering a patch 202. Compared to FIG. 1, the advantage of the present disclosure are:

1) the squint angle is closer to the direction of travel of the moving platform (narrower Doppler Cone Angle θ); and 2) Azimuthal coverage, $\theta_1$-$\theta_0$, covers a wider field because previously unavailable, extrapolated samples, are used in SAR image computation.

Patch 202 is illuminated at Doppler Cone Angle θ. The squint angle can be as large as 45 degrees. Patch 202 is being imaged closer to the forward direction of the radar platform as compared to FIG. 1. The usable data available for image computation is generally the same the one shown in FIG. 1. However, after application of the methods herein, extrapolated data from the usable data expands the data available for image computation. The effect is that the image of patch 202 is wider in the along track direction because of the disclosure herein.

In FIG. 2, patch 202, is bounded by slant ranges $R_0$ and $R_1$ and from $\theta_0$ to $\theta_1$ in azimuth. θ, the Doppler Cone Angle at which the illuminating antenna is pointed bisects the angle between $\theta_1$ and $\theta_2$.

In Synthetic Aperture Radar (SAR) return processing for image formation applicable to this invention, using RMA processing, the mathematical treatment calls for two domains of interest. One is the spatial domain where the familiar length, width, height and time parameters are used. The other domain is not quite as physically intuitive. This second domain is the frequency domain, where frequencies of occurrence of certain features present in the spatial domain are reflected. In the frequency domain, parameters of length, width, height and time are no longer immediately discernible, but rather interact in accordance with a transform. This transform, the Fourier Transform and its inverse, is used to change from the spatial domain to the frequency domain. The Fast Fourier Transform, or FFT, is an efficient tool to perform the Fourier Transform.

Signals in the two domains, s and S can be conveniently related by the Fourier transform, FT, for two variables X and Y in spatial domain and their counterparts $K_X$ and $K_Y$ in the frequency domain. The relationship is defined by:

$$S(K_x) = FT\{s(X)\} \int s(X) e^{-j2\pi X K_x} dX \qquad (1A)$$

$$S(K_y) = FT\{s(Y)\} \int s(Y) e^{-j2\pi Y K_y} dY \qquad (1B)$$

Spectrum in the frequency domain that corresponds to a SAR image is the integrated result of individual spectra corresponding to each target in the image, as each radar scatterer contributes to the overall spectrum.

In search (swath) mode, a radar beam sweeps the ground by maintaining constant antenna azimuth squint angle as the radar platform travels as illustrated in FIG. 1.

Another simplifying variable for facilitating subsequent analysis in the frequency domain is $K_R$, the fast time variable. The following expressions for three variables in spatial frequency domain are useful.

$$K_R = \frac{2}{\lambda}\left\{1 + \frac{\gamma}{f_c}\Delta t\right\} \quad (2)$$

$$K_X = -K_R \cos\theta$$

$$K_Y = \sqrt{K_R^2 - K_x^2}$$

where $\lambda$ is the wave length, $\gamma$ is the chirp slope of the linearly frequency modulated (LFM) waveform transmitted, $f_c$ is the radar center frequency, $\theta$ is the Doppler cone angle, and $\Delta t$ is the fast time variable within a pulse width.

Processing starts with the fast time variable $K_R$ in the range direction and the slow time variable in the along track (AT) direction. The first step is to convert from $K_R$ to $K_Y$ through Stolt interpolation.

The present disclosure's approach to reducing loss of samples due to high squint angles uses the Range Migration Algorithm (RMA). RMA type motion compensation is generally based on convolution operations. Generally, RMA consists of a two dimensional Fourier transform, then a multiply operation, a change of variables to arrive at rectilinear coordinates, and finally an inverse Fourier transform. RMA requires motion compensation along a line in the focus plane and allows imaging of a relatively large map without sub-swath/sub-patch processing.

Using search mode images formed using RMA, azimuth coverage in a single patch is large compared with that in spot mode, while resolution is lower. Shifting of signal support for a target is proportional to the displacement of targets in azimuth. In this disclosure RMA is desirable because of its good depth of focus and lack of range curvature distortions that may be present with other algorithms, such as the Polar Format Algorithm (PFA).

At broadside, the processor sample space in RMA after Stolt interpolation is similar to that of the PFA. For RMA, there is no significant loss of usable samples in the spatial frequency coordinates as long as the azimuthal aperture is small, typically less than 10 degrees. However, if the azimuthal aperture is considerably more, typically beyond 30 degrees, there is significant loss of usable samples at the output of the Stolt interpolation in RMA and the range—azimuth interpolation in PFA. Also, when the squint angle for the image is 30 degrees or more, the RMA sample space may suffer from a significant loss of usable samples, even if the azimuthal aperture is in the order of 5 to 6 degrees.

Figure 3:
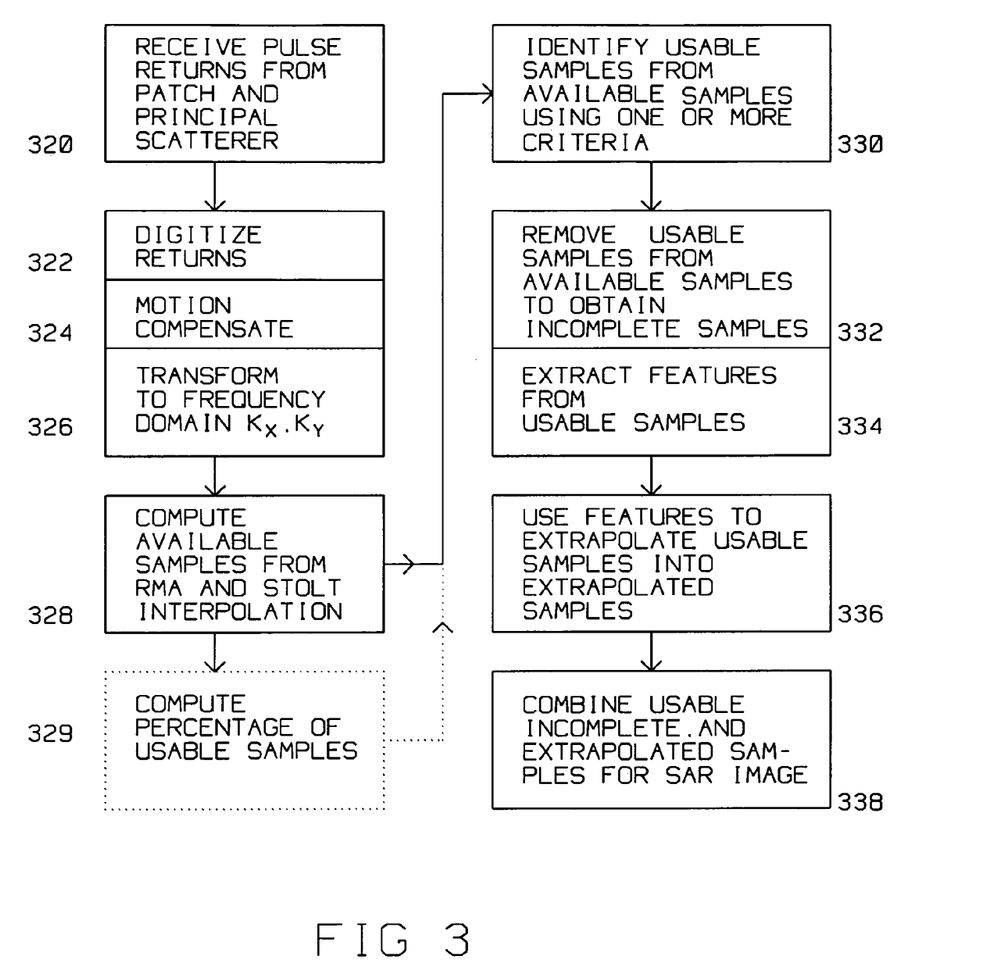
FIG. 3 is a flow diagram of the present disclosure.

Shown in FIG. 3 is the flow diagram applicable to this disclosure. A radar generates a search mode synthetic aperture image of a patch having one or more principal scatterers from periodic pulse returns reflected from said patch and said principal scatterer(s). The radar has forward motion, and its antenna illuminates the patch and its scatterers. The boundaries of the patch are from $R_0$ to $R_1$ in slant range and from Doppler Cone Angle $\theta_0$ to $\theta_1$ in azimuth as shown in FIG. 2. The radar comprises an analog to digital converter for converting the pulse returns from the patch and scatterers into a plurality of digital samples. Thus, Receive Pulse Returns Patch and Principal Scatterer 320 receives the reflected radar energy. Digitize Returns 322 converts the analog radar returns into digital samples. The digital samples are I+jQ quantities clocked from the A/D at range bin intervals. Within Motion Compensate 324, a computer motion compensates the digital samples with respect to radar motion to obtain a motion compensated digital array.

Transform to Frequency Domain 326 converts the motion compensated digital array to a frequency array in a frequency domain $K_x$, $K_y$. Using a Fast Fourier transform, the frequency array has $\Delta K_y$ rectangular aperture along y axis and a $\Delta K_x$ rectangular aperture along x axis.

Compute Available Samples from RMA and Stolt Interpolation 328 computes available samples from the frequency array using the Range Migration Algorithm including a Stolt interpolation. The size of available samples in the space $K_x$, $K_y$ is dependent on the number of range bins digitized by the analog to digital converter, and the size of the FFT (typically 128, 256, 512, 1024, 2048). Available samples is the number of samples made up of Usable samples and Incomplete Samples, as will be discussed with respect to FIG. 4.

Compute Percentage of Usable Samples 329 uses the following formula that gives the percentage of usable samples, among all Available samples, after RMA, is given by:

$$\frac{\alpha(\Delta K_x)^2}{0.5(K_{R_1}^2 - K_{R_0}^2)(\theta_1 - \theta_0)}$$

where $\Delta K_x$, $\Delta K_y$ is the size of rectangular aperture along $K_x$ and $K_y$ $$\alpha = \frac{\Delta K_y}{\Delta K_x}$$

$K_{R_1}$, $K_{R_0}$ are the upper and lower radial spatial frequency; $\theta_0$, $\theta_1$ are the start and end azimuth angle in processor space $K_x$ by $K_y$ $$\Delta K_x = \frac{K_{R_0}}{\cos\theta_1}\sin(\theta_1 - \theta)$$

where $\theta$ is defined from $$-\cos(\theta - \phi) + \sqrt{\cos(\theta - \phi)^2 + \varepsilon^2} = \frac{\cos\phi}{\cos\theta_1}\sin(\theta_1 - \theta)(1 + \alpha^2)$$

$$\varepsilon^2 = (1 + \alpha^2)\cos^2\phi\left[\frac{K_{R_1}^2 - K_{R_0}^2}{K_{R_0}^2}\right]$$

$$\tan\phi = \alpha$$

For example, the percentage of lost processor samples using RMA varies from 55% at a squint angle of 45 degrees to about 20% at a squint angle of 5 degrees, when the azimuthal sweep angle is 6.58 degrees. This computation is typically carried out whenever the squint angle changes to determine what criterion, of a plurality of criteria, is to be used in the next step.

Extrapolated Samples from Usable Samples.

Samples are the frequency domain equivalent of range bin by range bin digitized I+jQ analog to digital conversions corresponding along the slant range of FIG. 2 from platform to patch 202 starting at $R_0$ and extending to $R_1$, from $\theta_0$ to $\theta_1$.

Identify Usable Samples From Available Samples Using One or More Criteria 330 identifies (selects) usable samples from all available samples using one or more criteria. Examples of the criteria used for selecting usable samples are detailed in FIG. 4, FIG. 5 and FIG. 6. The example shown in FIG. 4, as a best mode implementation, one criterion of said one or more criteria for identifying usable samples in the frequency domain $K_x$, $K_y$ is a maximum area rectangle of fixed proportions of Usable Samples 420 circumscribed within frequency domain boundaries from $R_0$ to $R_1$ in slant range and from $\theta_0$ to $\theta_1$ in azimuth. Usable Samples 420 are part of, and extracted from Available Samples 440. Usable Samples 420 are within a maximum area rectangle of fixed proportions having a proportion (ratio) of $$\frac{\Delta K_y}{\Delta K_x}$$

where $\Delta K_y$ is the rectangular aperture along y axis and $\Delta K_x$ is the rectangular aperture along x axis.

Figure 4:
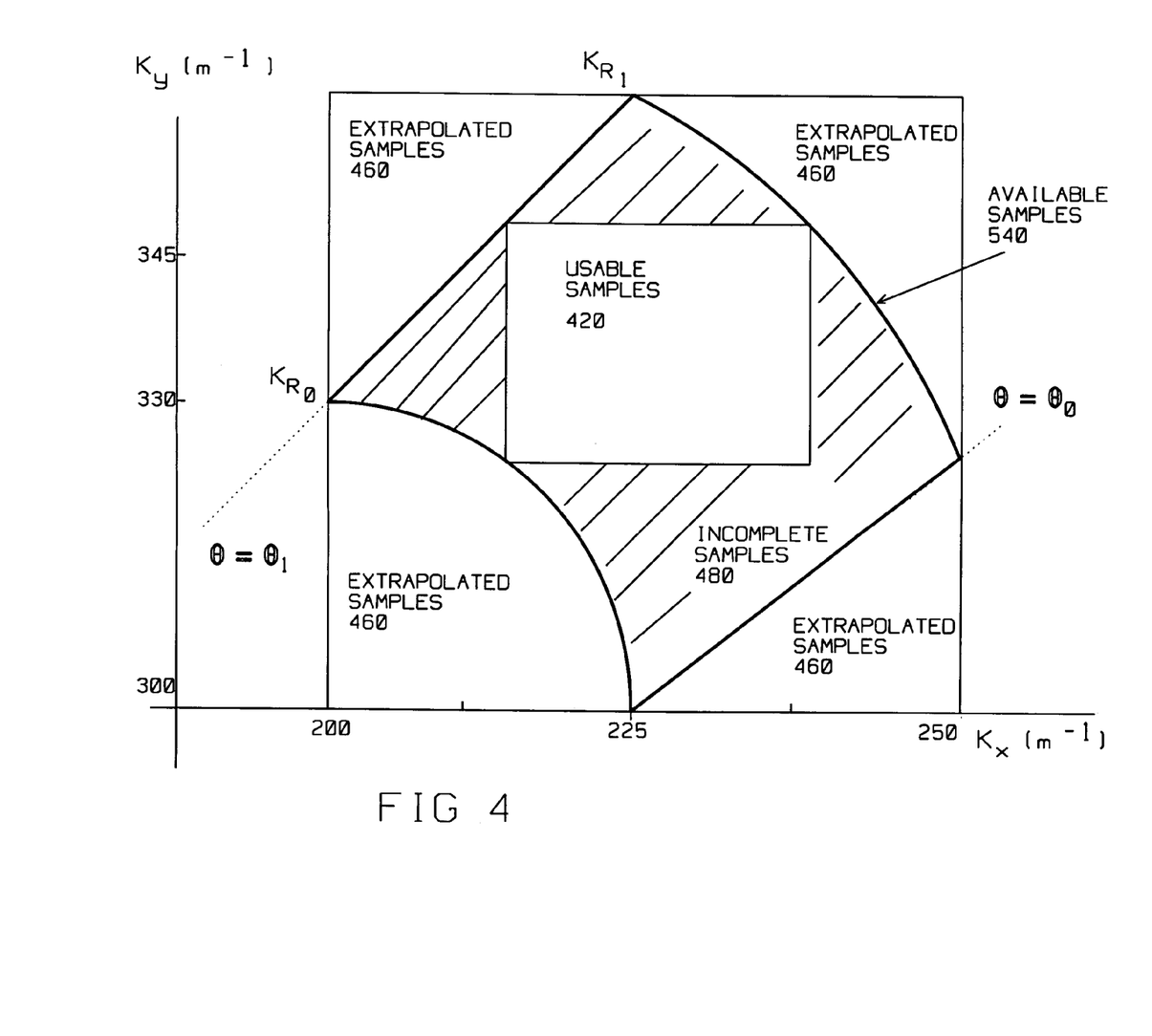
FIG. 4 is an RMA processor space showing one criterion of one or more criteria for identifying unusable samples in $K_x$, $K_y$ space where a maximum area rectangle of fixed proportions is circumscribed within $K_{R_1}$, $K_{R_0}$, $\theta_1$, $\theta_0$ boundaries.

Described below is a method for extrapolating Extrapolated Samples 460 from Usable Samples 420. Where both Extrapolated Samples 460 and Available Samples 440 are computed within the $K_x$, $K_y$ space, Available Samples 440 are used. That is, Where both Extrapolated Samples 460 and Available Samples 440 exist at a matrix location within the $K_x$, $K_y$ space, Available Samples 440 are used instead of Extrapolated samples 460. The part of Available Samples 440 not part of Usable Samples 420 are called Incomplete Samples 480. Substituting Incomplete Samples for Extrapolated Samples 460 preserves more of the original information collected from the principal scatterer(s).

Figure 5:
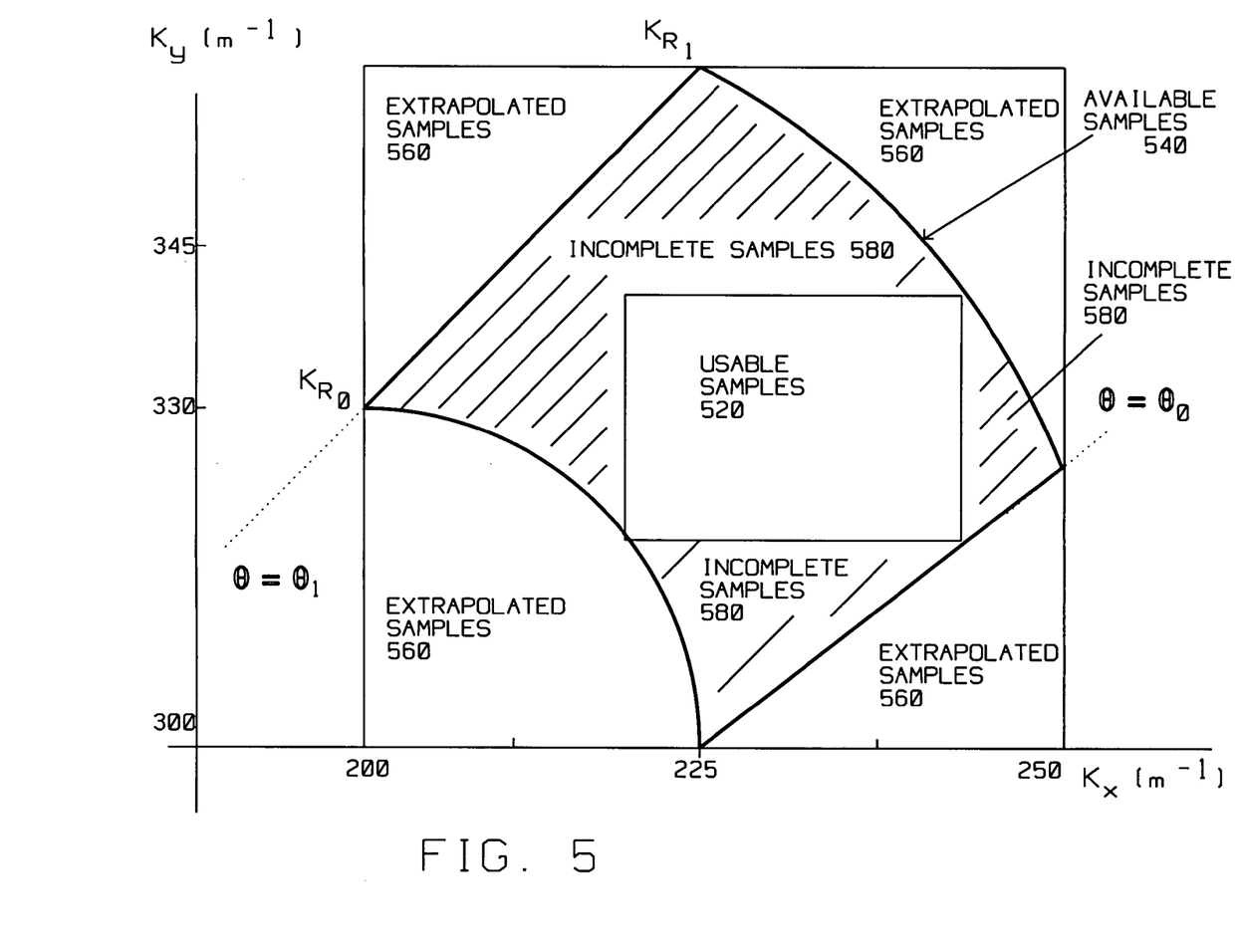
FIG. 5 is an RMA processor space showing one criterion of one or more criteria for identifying unusable samples in $K_x$, $K_y$ space where an arbitrary rectangle of maximum area, is circumscribed within $K_{R_1}$, $K_{R_0}$, $\theta_1$, $\theta_0$ boundaries.

A less stringent criterion is shown in FIG. 5. Here, the same configuration as in FIG. 4 identifies Usable Samples 520 as being within a maximum area rectangle of variable proportions. More Usable Samples 520 may be available here because the constraint of fixed proportions has been removed.

Other criteria may be considered, reflecting constraints due to terrain, radar performance, lack of strong scatterers within the patch, historical information etc.

In FIG. 5, the same principle applies as in FIG. 4. Extrapolated samples 560 are extrapolated from Usable Samples 520 to fill the $K_x$, $K_y$ space. Where both Extrapolated Samples 560 and Available Samples 540 exist within the $K_x$, $K_y$ space, Incomplete Samples 580 (a subset of Available Samples 540) are used instead of Extrapolated Samples 560.

Figure 6:
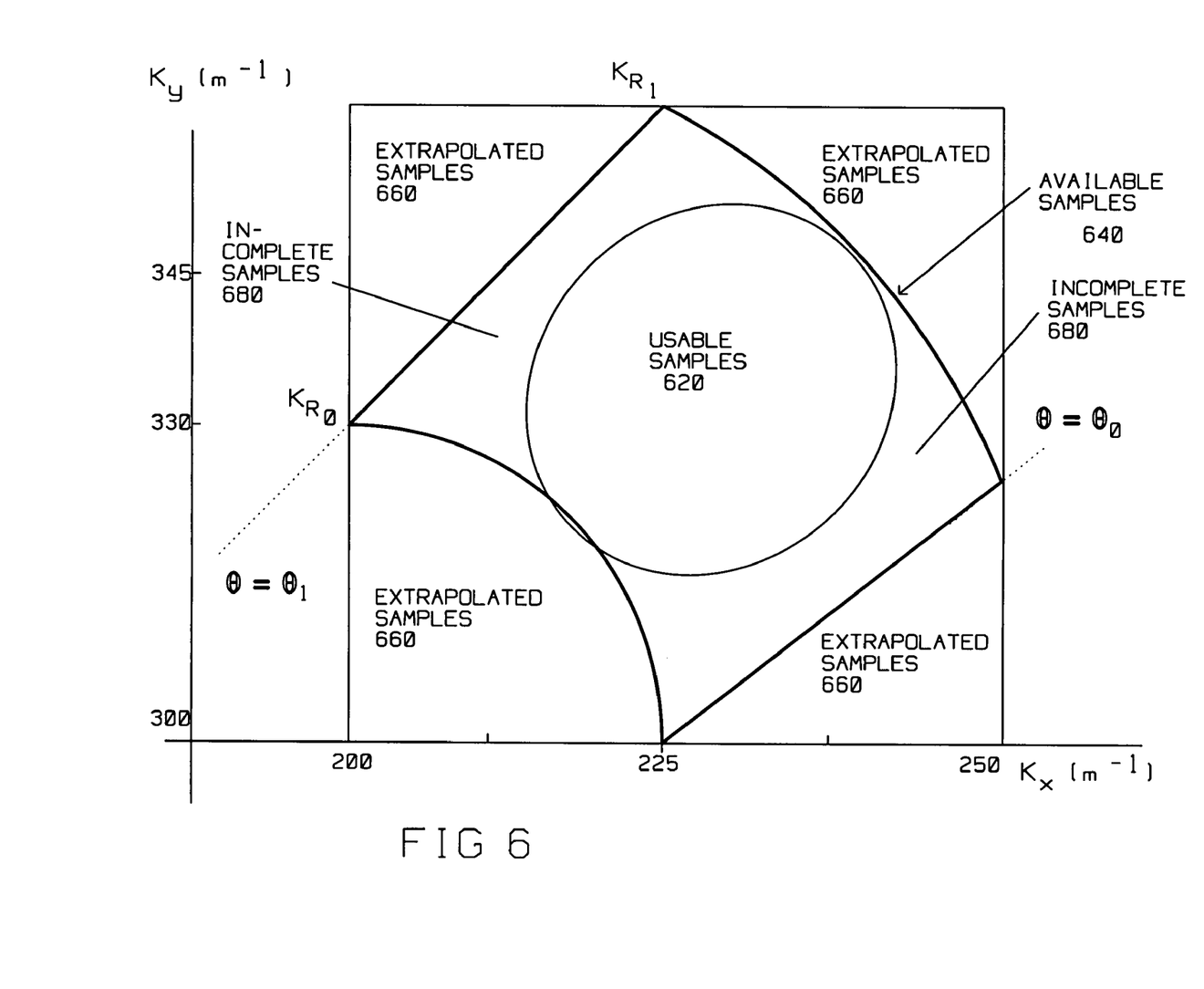
FIG. 6 is an RMA processor space showing one criterion of one or more criteria for identifying unusable samples in $K_x$, $K_y$ space where an ellipse patterned after the footprint of the transmit antenna is circumscribed within $K_{R_1}$, $K_{R_0}$, $\theta_1$, $\theta_0$ boundaries.

Shown in FIG. 6, is yet another example of a criterion of said one or more criteria for identifying said usable samples in the frequency domain $K_x$, $K_y$. This criterion is an ellipse having a major axis circumscribed within the boundaries from $R_0$ to $R_1$ in slant range along a line bisecting azimuth boundaries from $\theta_0$ to $\theta_1$. The ellipse has a minor axis perpendicular to the major axis, and the minor axis is, for example, half of the major axis. This configuration approximates the footprint of an antenna illuminating patch 202 at ground level. Usable samples 620 are used for extrapolating Extrapolated samples 660. Where both Extrapolated Samples 660 and Available Samples 640 exist within the $K_x$, $K_y$ space, Available Samples 640 are used. Incomplete samples 680 are those samples pat of Available Samples 640 not used for extrapolation of Extrapolated Samples 660. Considering that a circle is special case of an ellipse, using the same concept, another criterion of said one or more criteria for identifying usable samples 620 among available samples 640 in the frequency domain $K_x$, $K_y$ is a (maximum area) circle circumscribed within the boundaries from $R_0$ to $R_1$ in slant range and from $\theta_0$ to $\theta_1$ in azimuth.

Returning to FIG. 3, Remove Usable Samples from Available Samples to Obtain Incomplete Samples 332 removes the Usable Samples 420 from the Available Samples 440 to obtain Incomplete Samples 480.

Figure 7:
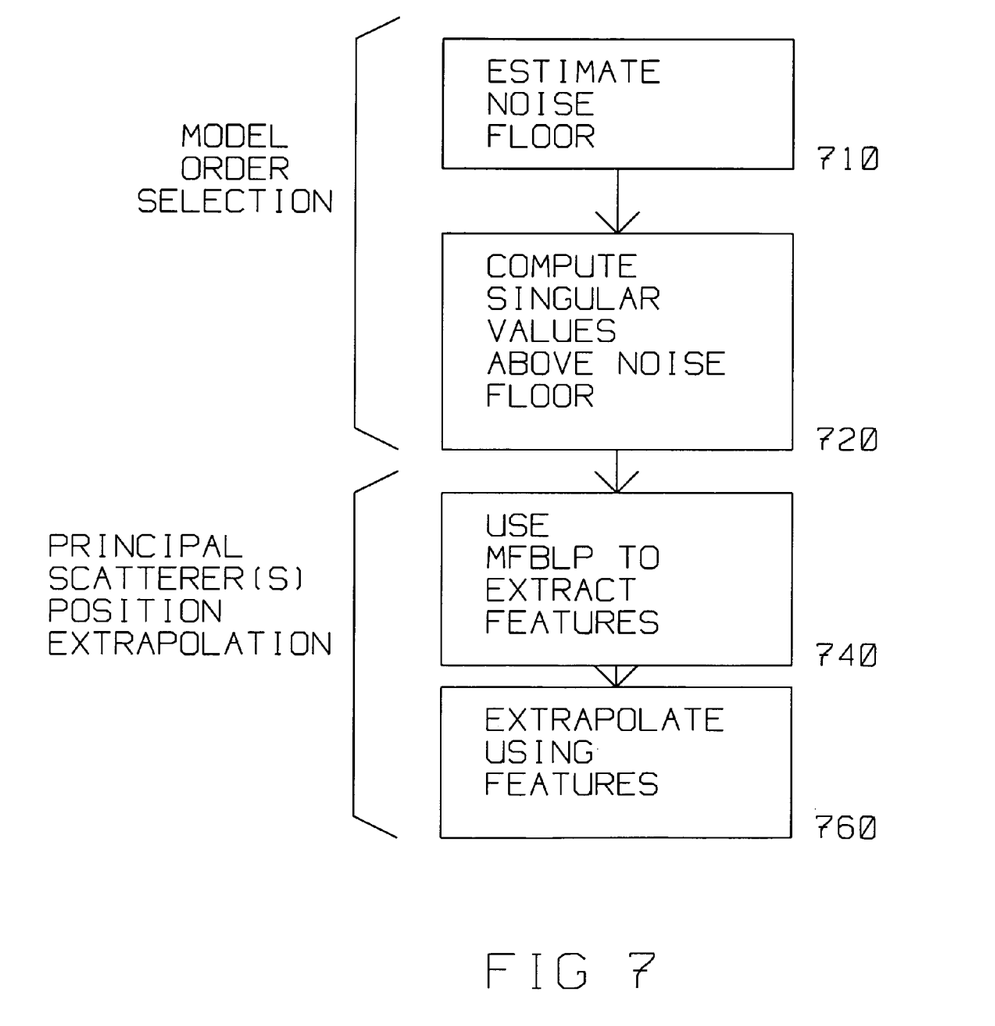
FIG. 7 shows Model Order selection and Principal Scatterer(s) Position Extrapolation.

Extract Features From Usable Samples 334 identifies bandwidth elements of the principal scatterer(s) contained in the usable samples, such as Usable Samples 420 in FIG. 4 to be used in the next step. The procedure is detailed in FIG. 7:

1) Model Order Selection
   a. A forward backward raster matrix composed of compressed samples corresponding to a single range/azimuth cell is formed.
   b. The singular value decomposition of this matrix is computed.
   c. In Estimate Noise Floor 710, the lower third of the singular values are averaged in power to give an estimate of the noise floor. In the alternative, for example, the lower 10 percent of the singular values are used for a lower noise floor.
   d. In Compute Singular Values Above Noise Floor 720, after choosing a threshold, compute the number of singular-values whose square is above the noise floor by the amount of the chosen threshold. This yields a model order.

2) Principal Scatterer Position Extrapolation (Estimation).

The position of the principal scatterers is estimated in each frequency domain Range/Az cell using the Modified Forward-Backward Linear Prediction (MFBLP) method, as described by Tufts D. W. and R. Kumerasan in Estimation of Frequencies of *Multiple Sinusoids: Making Linear Prediction Perform Like Maximum Likelihood*, Proc IEEE Vol 70 pp 975-989, September 1982, incorporated herein in its entirety by reference. This method uses the model order computed above to minimize the noise in the samples and enhance the accuracy of the scatterer location. Use MFBLP to Extract Features 740 uses the model order to extract relevant features from Usable Samples 420 in conjunction with the MFBLP method. Extrapolate Using Features 760 extrapolates Extrapolated Samples 460.

The procedure is:
   a. Using the extracted scatterer position (the feature) define a phase steering matrix which consists of phasors in arithmetic progression, one per scatterer, swept over the spatial frequency.
   b. A complex envelope vector of the scatterers is computed from the pseudo-inverse of the phase steering matrix times the vector of samples.
   c. The extended phase steering matrix is computed by extending spatial frequency samples by the an amount necessary to fill the number of samples making up the SAR image using the phase steering matrix.
   d. The forward/backward extrapolation for the corrected samples is obtained by multiplying an extended phase steering matrix with the complex envelope vector, which is the vector of samples in a single range/azimuth cell in $K_x$, $K_y$ space.

The extrapolation is kept to within a factor of three from the original dimensions of the phase history.

The scatterers and their location thus obtained become the features used in Use Features to Extrapolate Usable Samples into Extrapolated Samples 336 in FIG. 3.

In Combine Usable Incomplete and Extrapolated Samples for SAR image 338, Usable Samples 420 are combined with Extrapolated Samples 460 and Incomplete Samples 480 thus generating a full $K_x$, $K_y$ matrix compatible in its $K_x$, $K_y$ coordinates and content with subsequent SAR image processing.

The SAR image thus obtained has enhanced resolution and better signal to noise ratio as compared to a SAR image not having Extrapolated Samples 460 in its originating $K_x$, $K_y$ matrix.

In further detail, each of the Extrapolated Samples 460 is examined to seek a matching Incomplete Sample 480. If a match is found, the matching Extrapolated Sample 460 is deleted, and its respective Incomplete Sample 480 is substituted therefor. To illustrate, one of the Extrapolated Samples 460 having first coordinates along the $K_x$ axis and the $K_y$ axis is removed whenever said first coordinates are equal to second coordinates along the $K_x$ axis and the $K_y$ axis. The second coordinates correspond to one of the Incomplete Samples 480. The one of the Incomplete Samples 480 having the second coordinates is substituted for the one of the Extrapolated Samples 460 having the same, first coordinates.

The procedure calls for extrapolating data from Usable Samples 420 to Extrapolated Samples 460 using the coordinates:

$$\lfloor K_{R_0}\cos\theta_1\ K_{R_1}\cos\theta_0 \rfloor \times \lfloor K_{R_0}\sin\theta_0\ K_{R_1}\sin\theta_1 \rfloor$$

in $K_x \times K_y$ space.
The resolution improves from $$\frac{\pi}{\Delta K_x} \text{ to}$$

$$\frac{\pi}{K_{R_1}\cos\theta_o - K_{R_0}\cos\theta_1}$$

in $K_x$ and from $$\frac{\pi}{\Delta K_y} \text{ to}$$

$$\frac{\pi}{K_{R_1}\sin\theta_1 - K_{R_0}\sin\theta_0}$$

in $K_y$.

In a preferred embodiment, Extrapolated Samples 460 are compared as to their location within $K_x$, $K_y$ space to Incomplete Samples. Where Extrapolated Samples 460 are located at the same $K_x$, $K_y$ space location as Incomplete samples, Incomplete samples are used instead of Extrapolated samples 460 wherever available within the $K_x$, $K_y$ space.

Extrapolated Samples 460 blend well with the Incomplete Samples 480 because both are derived from the discrete scatterer(s) components of Usable Samples 420. This is the case because feature(s) present in the scatterers were originally contained in Usable Samples 420, and the same information is extrapolated for Extrapolated Samples 460, and the resulting SAR image.

All references cited in this document are incorporated herein in their entirety by reference.

Although presented in exemplary fashion employing specific embodiments, the disclosed structures are not intended to be so limited. For example, although the optimization herein is described in the context of a radar system, it is also applicable for sonar, or similar imaging methods, where an image of scatterers is extracted from coherent summing of a plurality of phase accurate returns.

Those skilled in the art will also appreciate that numerous changes and modifications could be made to the embodiment described herein without departing in any way from the invention. For example, the Extract Features from Usable Samples 334 step can use other methods for identifying relevant features to be applied in this disclosure.

The invention claimed is:

1. A radar for generating a search mode synthetic aperture image of a patch having a principal scatterer from periodic pulse returns reflected from said patch and said principal scatterer, said radar having a motion, said radar having an antenna illuminating boundaries of said patch from $R_0$ slant range to $R_1$ slant range and from an azimuth angle $\theta_0$ to an azimuth angle $\theta_1$, said radar comprising:
an analog to digital converter for converting said pulse returns into a plurality of digital samples;
a computer for:
motion compensating said digital samples with respect to said motion to obtain a motion compensated digital array;
converting said motion compensated digital array to a frequency array in a frequency domain $K_x$, $K_y$ using a transform, said frequency domain having coordinates having a $K_x$ axis and a $K_y$ axis, said frequency array having a rectangular aperture, said rectangular aperture extending $\Delta K_x$ along said $K_x$ axis, said rectangular aperture extending $\Delta K_y$ along said $K_y$ axis;
computing available samples from said frequency array in said frequency domain using a Range Migration Algorithm including a Stolt interpolation;
identifying usable samples from said available samples using one or more criteria;
removing said usable samples from said available samples to obtain incomplete samples;
extracting features related to said patch having a principal scatterer from said usable samples;
using said features to extrapolate extrapolated samples from said usable samples;
combining said extrapolated samples said usable samples and said incomplete samples for computing said search mode synthetic aperture image of said patch and said principal scatterer.

2. A radar system as described in claim 1 wherein said transform is the Fourier Transform.

3. A radar system as described in claim 2 wherein one criterion of said one or more criteria for identifying said usable samples within said frequency domain $K_x$, $K_y$ is an equivalent maximum area rectangle circumscribed within said boundaries of said patch from $R_0$ to $R_1$ in slant range and from $\theta_0$ to $\theta_1$ in azimuth.

4. A radar system as described in claim 3 wherein said maximum area rectangle has a ratio $$\frac{\Delta K_y}{\Delta K_x}.$$

5. A radar system as described in claim 2 wherein one criterion of said one or more criteria for identifying said usable samples within said frequency domain $K_x$, $K_y$ is an ellipse having a major axis circumscribed within said boundaries of said patch from $R_0$ to $R_1$ in slant range along a line bisecting said boundaries from $\theta_0$ to $\theta_1$ in azimuth.

6. A radar system as described in claim 5 wherein one criterion of said one or more criteria for identifying said usable samples within said frequency domain $K_x$, $K_y$ is an ellipse having a minor axis perpendicular to said major axis, said minor axis half of said major axis.

7. A radar system as described in claim 2 wherein a percentage of usable samples is computed from said available samples, said percentage indicative of which criterion of said one or more criteria is to be used for identifying said usable samples from said available samples.

8. A radar system as described in claim 2 wherein one of said extrapolated samples having first coordinates along said $K_x$ axis and said $K_y$ axis is removed whenever said first coordinates are equal to second coordinates along said $K_x$ axis and said $K_y$ axis, said second coordinates corresponding to one of said incomplete samples, and said one of said incomplete samples having said second coordinates is substituted for said extrapolated samples having said first coordinates.

9. A method for generating a search mode synthetic aperture image of a patch having a principal scatterer from periodic pulse returns reflected from said patch and said principal scatterer using a radar, said radar having a motion, said radar having an antenna illuminating boundaries of said patch from $R_0$ slant range to $R_1$ slant range and from an azimuth angle $\theta_0$ to an azimuth angle $\theta_1$, said method comprising the steps of:

converting said pulse returns into a plurality of digital samples;

motion compensating said digital samples with respect to said motion to obtain a motion compensated digital array;

converting said motion compensated digital array to a frequency array in a frequency domain $K_x$, $K_y$ using a transform, said frequency domain having coordinates having a $K_x$ axis and a $K_y$ axis, said frequency array having a rectangular aperture, said rectangular aperture extending $\Delta K_x$ along said $K_x$ axis, said rectangular aperture extending $\Delta K_y$ along said $K_y$ axis;

computing available samples from said frequency array in said frequency domain using a Range Migration Algorithm including a Stolt interpolation;

identifying usable samples from said available samples using one or more criteria;

removing said usable samples from said available samples to obtain incomplete samples;

extracting features related to said patch having a principal scatterer from said usable samples;

using said features to extrapolate extrapolated samples from said usable samples;

combining said extrapolated samples said usable samples and said incomplete samples for computing said search mode synthetic aperture image of said patch and said principal scatterer.

10. A method as described in claim 9 wherein said transform is the Fourier Transform.

11. A method as described in claim 10 wherein one criterion of said one or more criteria for identifying said usable samples within said frequency domain $K_x$, $K_y$ is an equivalent maximum area rectangle circumscribed within said boundaries of said patch from $R_0$ to $R_1$ in slant range and from $\theta_0$ to $\theta_1$ in azimuth.

12. A method as described in claim 11 wherein said maximum area rectangle has a ratio $$\frac{\Delta K_y}{\Delta K_x}.$$

13. A method as described in claim 10 wherein one criterion of said one or more criteria for identifying said usable samples within said frequency domain $K_x$, $K_y$ is an ellipse having a major axis circumscribed within said boundaries of said patch from $R_0$ to $R_1$ in slant range along a line bisecting said boundaries from $\theta_0$ to $\theta_1$ in azimuth.

14. A method as described in claim 10 wherein one criterion of said one or more criteria for identifying said usable samples within said frequency domain $K_x$, $K_y$ is an ellipse having a minor axis perpendicular to said major axis, said minor axis half of said major axis.

15. A method as described in claim 10 wherein a percentage of usable samples is computed from said available samples, said percentage indicative of which criterion of said one or more criteria is to be used for identifying said usable samples from said available samples.

16. A method as described in claim 10 wherein one of said extrapolated samples having first coordinates along said $K_x$ axis and said $K_y$ axis is removed whenever said first coordinates are equal to second coordinates along said $K_x$ axis and said $K_y$ axis, said second coordinates corresponding to one of said incomplete samples, and said one of said incomplete samples having said second coordinates is substituted for said extrapolated samples having said first coordinates.

\* \* \* \* \*